(No Model.)  F. G. M. STONEY.  2 Sheets—Sheet 1.
SLUICE OR FLOOD GATE.

No. 282,400. Patented July 31, 1883.

Witnesses:
Harry Drury
James F. Tobin

Inventor:
Francis G. M. Stoney
by his Attys.
Howson and Son (No Model.)  2 Sheets—Sheet 2.
F. G. M. STONEY.
SLUICE OR FLOOD GATE.
No. 282,400. Patented July 31, 1883.
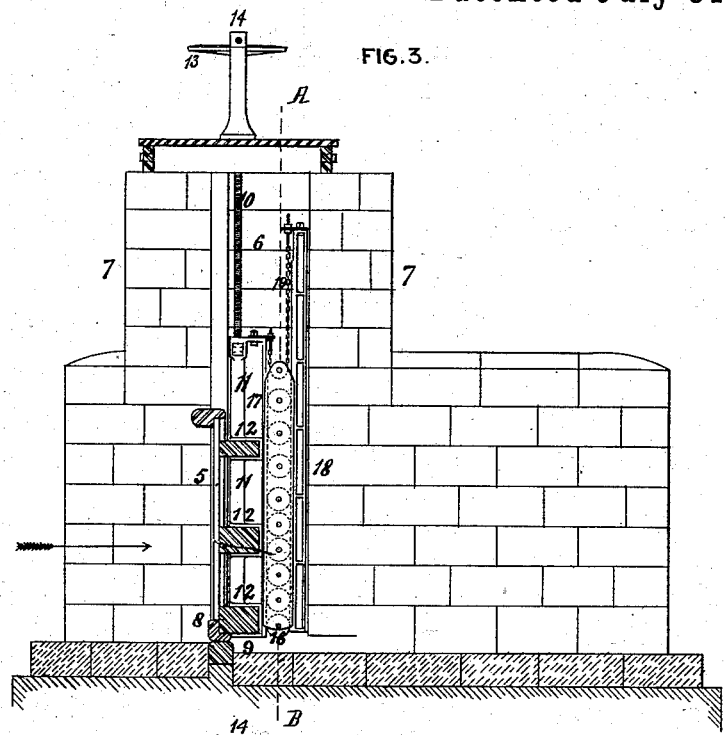
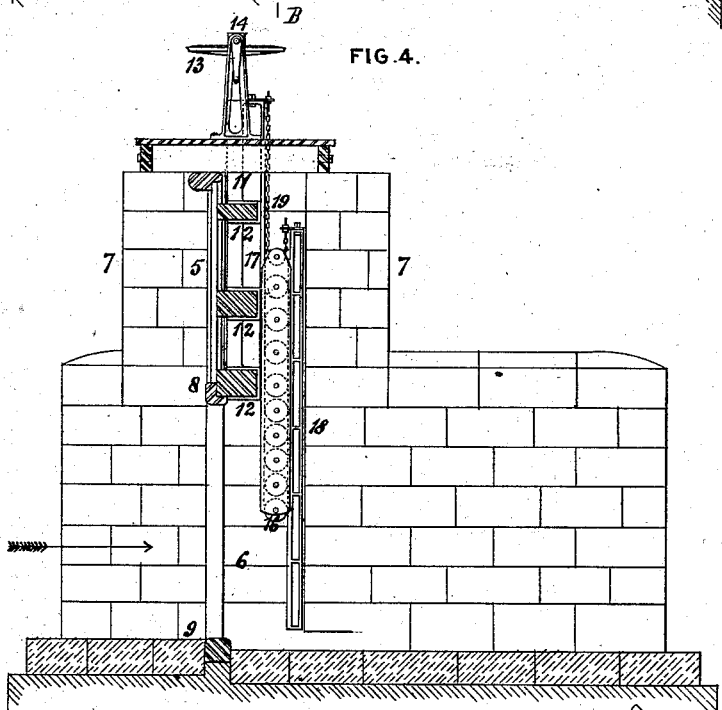
Witnesses:
Harry Drury
James T. Tobin
Inventor:
Francis G. M. Stoney
by his attys.
Towsm and Tony

UNITED STATES PATENT OFFICE.

FRANCIS G. M. STONEY, OF LONDON, ENGLAND.

SLUICE OR FLOOD GATE.

SPECIFICATION forming part of Letters Patent No. 282,400, dated July 31, 1883.

Application filed February 16, 1883. (No model.) Patented in England September 10, 1874, No. 3,103.

*To all whom it may concern:*

Be it known that I, FRANCIS GOOLD MORONY STONEY, a subject of the Queen of Great Britain and Ireland, and residing at London, England, have invented an Improvement in Sluice or Flood Gates, (for which I have obtained British Letters Patent, dated September 10, 1874, No. 3,103,) of which the following is a specification.

The object of my invention is to construct sluices or flood-gates in an improved and simplified manner, so that the gates may be operated with little power, and yet be durable and not easily put out of order.

My improvements are chiefly intended for the drainage or relief of large rivers, reservoirs, and the like; but are also applicable for regulating or controlling the flow of any streams. My sluices are suitable for openings or passages of considerable width—for example, fifteen or thirty feet. Any number of them may be applied in the same channel to correspond to any required water-way.

The principal and distinguishing feature of my invention consists in an arrangement whereby the pressure of the water is entirely taken upon free sets of rollers traveling between vertical or nearly vertical rails on the back of the sluice-gate and similar rails on the sluiceway.

Figure 1:
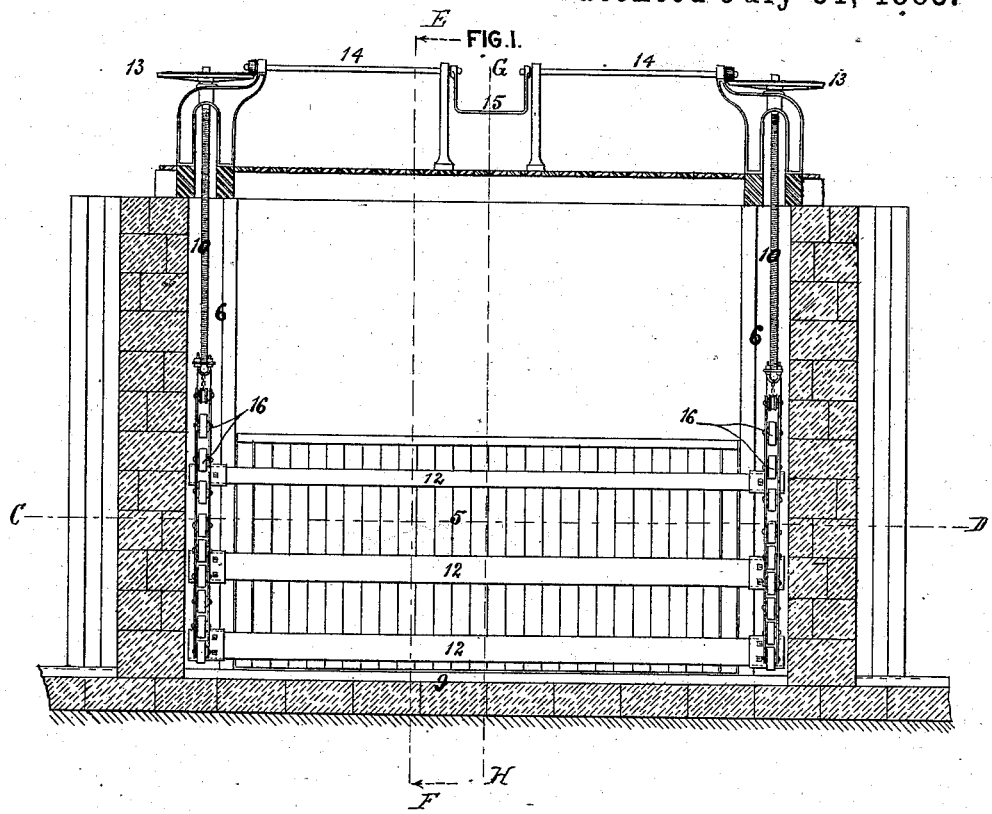
Figure 2:
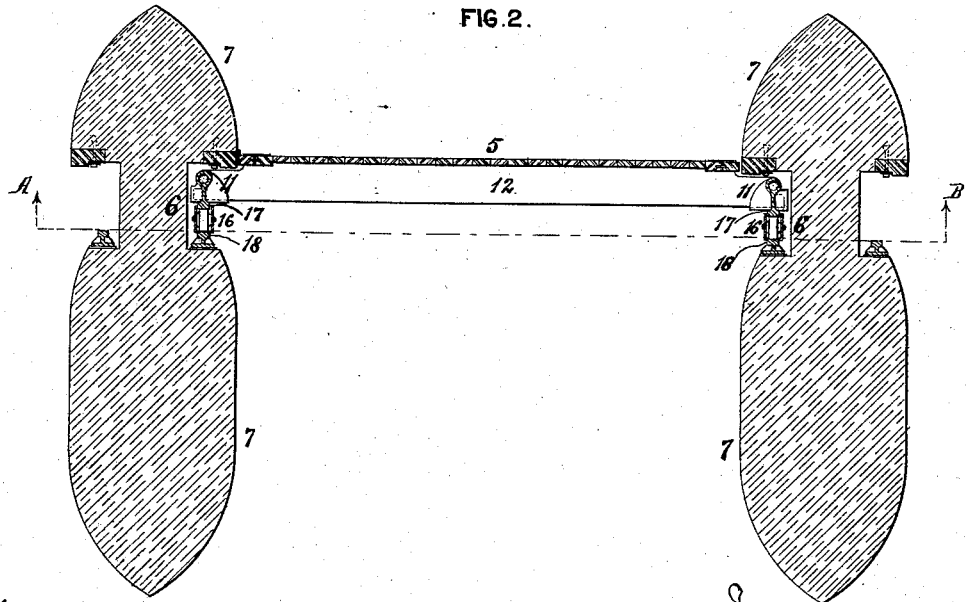

In the accompanying drawings, Figure 1 is a vertical section on the line A B, Figs. 2 and 3; Fig. 2, a sectional plan on the line C D, Fig. 1; Fig. 3, a vertical section on the line E F, Fig. 1, showing the gate closed; and Fig. 4, a vertical section on the line G H, Fig. 1, but with the gate in an elevated position.

The sluice-gate 5 is a strong vertical slide or shutter, represented as a framed wooden structure, but which may be made of iron, or of iron and wood combined. This sluice-gate 5 is fitted to work in vertical grooves 6, formed for it in piers 7, or in the side walls of the channel, and when closed has its bottom edge, 8, in contact with the sill or bottom 9 of the opening, while its top edge then stands at high-water or flood level. The sluice is opened by raising it, and the mechanism shown for raising it consists of vertical screw-spindles 10, attached to the vertical frame-pieces 11, which are fixed to the projecting ends of the horizontal beams 12 of the gate, and are situated in the grooves 6 of the pier or side walls. The screw-spindles 10 are tapped through the internally-screwed bosses of bevel-wheels 13, which have gearing with them bevel-pinions on horizontal shafts 14, arranged to be worked together by the same winch-handles 15.

The pressure of the water, which is in the direction shown by the arrows in Figs. 3 and 4, is entirely taken up by free sets of rollers 16, (the rollers being indicated by dotted circles in Figs. 3 and 4,) traveling between vertical rails 17, formed or fixed on the side frames, 11, of the sluice-gate, and similar rails, 18, fixed in the pier-grooves 6. Each set of rollers 16 is held in a frame consisting principally of a pair of plates, and suspended by a chain, 19, which passes under a pulley at the upper end of the roller-frame, and has its ends attached to the upper parts, respectively, of the gate-rail 17 and of the fixed rail 18 in each case. In consequence of this arrangement the roller-frames rise or fall half the distance moved through by the gate.

I am aware that anti-friction rollers mounted in bearings in the sluice-gates have been used; but I do not desire to claim anti-friction rollers generally in combination with sluice-gates.

I claim as my invention—

1. The combination of a sluice and sliding sluice-gate with free sets of rollers interposed and adapted to travel between the sluiceway and the edges of the gate to sustain the pressure of the water on the gate, substantially as and for the purpose set forth.

2. The combination of a sluice and sliding sluice-gate with sets of rollers interposed between rails on the sluiceway and rails on the gate, and a suspension-chain for the rollers connected to the gate and sluiceway, substantially as described.

In testimony whereof I have signed my name to this specification in the presence of two subscribing witnesses.

F. G. M. STONEY.

Witnesses:
 CHARLES S. WILDMAN,
 HAYDN PINKESS.